United States Patent Office 2,760,638
Patented Aug. 28, 1956

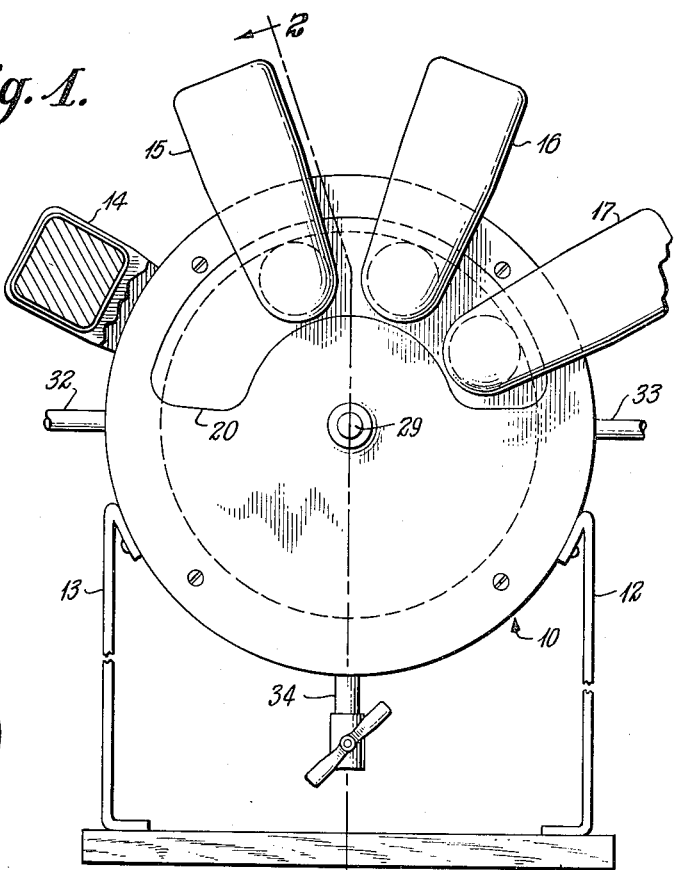
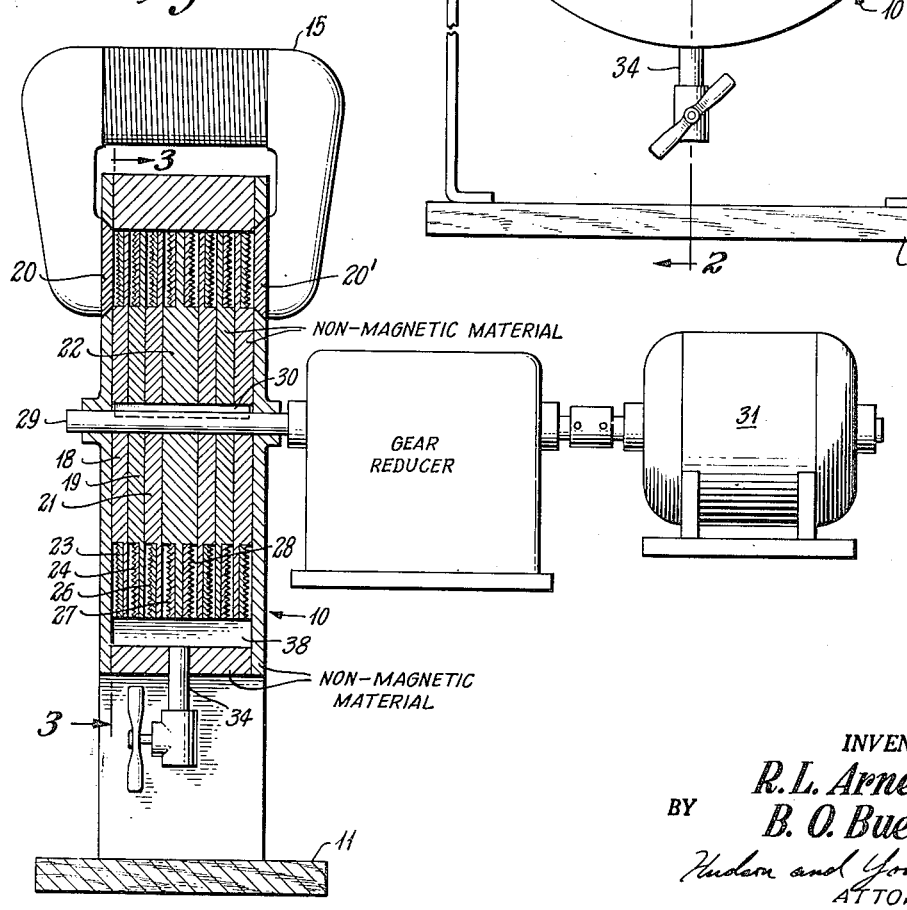

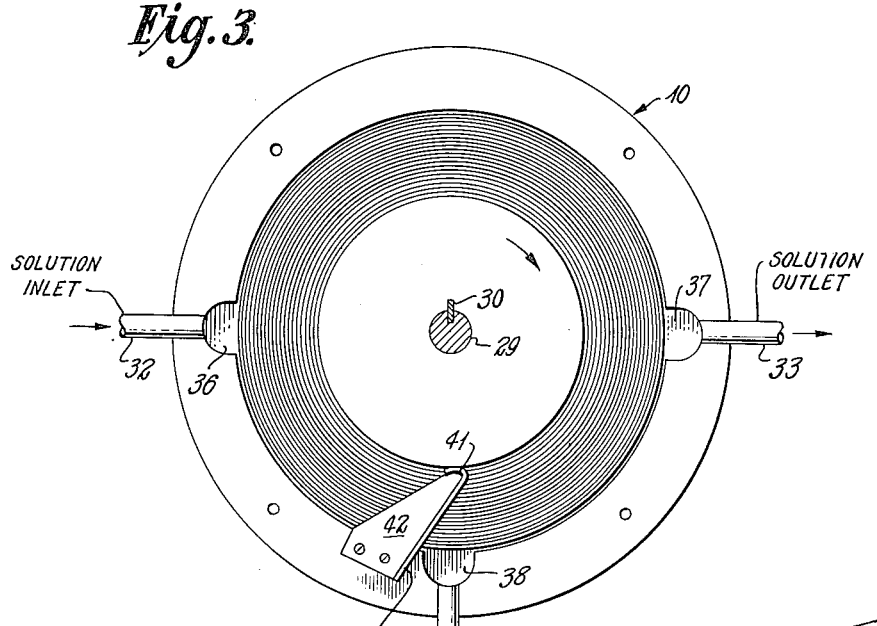
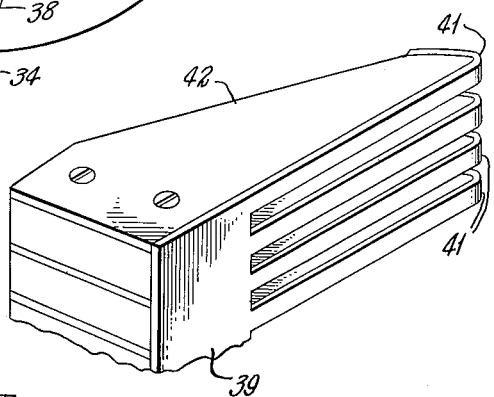
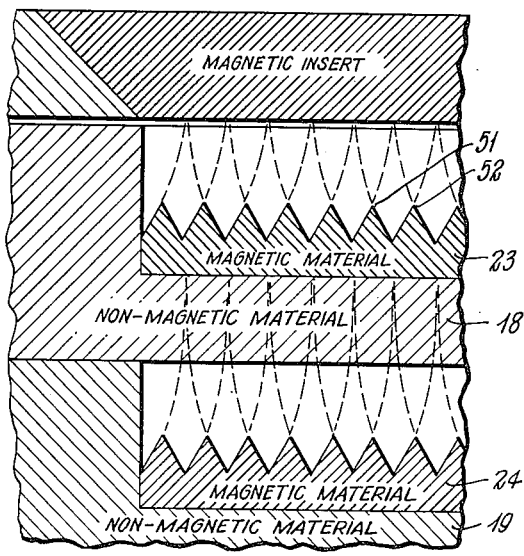

2,760,638

MAGNETIC SEPARATOR

Raymond L. Arnett and Barry O. Buell, Bartlesville, Okla., assignors to Phillips Petroleum Company, a corporation of Delaware Application May 6, 1954, Serial No. 427,949

6 Claims. (Cl. 210—1.5)

This invention relates to a magnetic separator. In a further aspect this invention relates to a magnetic separator provided with a plurality of rotating magnetizable washers mounted upon non-magnetizable disks, said washers rotating in an annulus, a portion of said annulus being within a magnetic field. In a further aspect this invention relates to a magnetic separator particularly suitable for the removal of a finely divided magnetizable catalyst from lyophilic colloids. In a further aspect this invention relates to a method of separating finely divided magnetizable material from a liquid.

Hydrogenated polymers of conjugated dienes have found wide use in the production of materials such as insulation, protective coatings, etc. resistant to low temperatures, safety glass innerliners, moldable plastics, and other uses. Such hydrogenated polymers are generally prepared by hydrogenating a solution of the polymer. One catalyst which has been widely used for this process is nickel on kieselguhr. A problem connected with this process is the fact that catalyst removal is very difficult since normal filtering processes, such as filter paper and commercial filters have not been entirely satisfactory. This is due to the fact that these solutions form lyophilic colloids, i. e. solutions in which the colloid has a very high affinity for the solvent. Such solutions have very high viscosity even at high dilution ratios.

Each of the following objects is obtained by at least one of the aspects of this invention.

An object of this invention is to provide a magnetic separator.

A further object is to provide a continuous magnetic separator.

A further object of this invention is to provide apparatus suitable for the removal of finely divided magnetizable material from lyophilic colloids, such as hydrogenated polymers of conjugated dienes.

A further object is to provide increased efficiency of the use of the magnetic field and concentration of magnetic gradient for separating magnetizable material.

A further object of this invention is to provide a method for removing magnetizable particles from a liquid.

Other objects and advantages of this invention will be apparent to one skilled in the art upon reading this disclosure.

In order that the invention may be fully understood, reference is made to the accompanying disclosure which includes a drawing in which:

Figure 1 is a side elevation, partly in section, of the apparatus of this invention;

Figure 2 is a cross-section view of the apparatus of this invention taken on line 2—2 of Figure 1;

Figure 3 is a cross-section taken on line 3—3 of Figure 2;

Figure 4 is an enlarged view of the comb used in this invention; and

Figure 5 is an enlarged section view, illustrating the lines of force between the magnetic elements in the apparatus, these lines of force being indicated by dotted lines.

Broadly speaking, this separator comprises a closed substantially cylindrical chamber having magnets positioned around a portion of this chamber. Within the chamber rotating washers, mounted upon disks, pass through the field produced by these magnets. The solution containing the magnetizable material passes over these washers through the magnetic field and the particles are attracted to the washers. Following the passage through the field, the solution is withdrawn and, at a later stage in the rotation, the magnetizable particles are removed from the rotating washers and discharged from the apparatus.

Directing attention to Figure 1, wherein a side elevation of the apparatus is shown, 10 designates the closed housing defining the substantially cylindrical chamber of this apparatus. This chamber can be mounted upon any suitable support 11 by support members 12 and 13. This chamber 10, constructed of non-magnetizable material, is provided with a plurality of magnets 14, 15, 16, and 17. These magnets may be electromagnets or permanent magnets. The magnets have their pole faces on each side of chamber 10 and extend for a portion of the circumference of the chamber, the pole faces defining an annulus or an annular ring in the wall of the chamber 10. Within the walls of the chamber are magnetic inserts or pole pieces 20 and 20'. Preferably, these plates cover approximately one-half of the side wall as shown in the drawing.

In Figure 2, a sectional view, the rotatable plates or disks are shown. Certain of these are identified as 18, 19, 21 and 22. Each plate is provided with a washer positioned within an offset therein, such as washers 23, 24, 26, 27 and 28. These washers define an annulus within the chamber. It will be noted that the centermost disk 22 is provided with two offset portions and two washers 27 and 28. The disks are mounted upon shaft 29 and held on this shaft by key 30. Drive means 31 are provided to cause the plates to rotate. The disks and the outer shell of chamber 10 are constructed of non-magnetizable material while the washers are of magnetizable material. Brass, aluminum, and various plastics are suitable for the disks while iron or steel is used for the washers mounted thereon. The offset in the rotating disks is such that, when the washers are mounted thereon, there is a free space between one disk and the outside of the washer on the adjacent disk, but no space between the central sections of the disks. This spacing should be such that the distance between the outside of one washer and the surface of the next plate or rotating disk is less than the distance between the surface of the rotating disk and the inside surface of the washer mounted thereon.

An inlet 32 communicates with the spaces between these rotating disks at a point upstream of the poles of the magnets, i. e. before a given point on the washer passes between the inserts 20 and 20' although the inlet can be located just beyond the leading edge of the insert. An outlet 33 is located such that it communicates with these spaces at a point downstream of the inserts 20 and 20'. Positioned beyond outlet 33 and outside of the magnetic field is an outlet 34.

Said inlet and outlets are best shown in Figures 1 and 3, Figure 3 also showing the distributing chamber 36 and receiving chambers 37 and 38. Positioned immediately beyond, in the direction of rotation, removal conduit 34 is a comb 39, this being shown more specifically in Figure 4. This comb is provided with a plurality of fingers 41, these extending into the slots or free space between each washer and the adjacent rotating plate. For rigidity, each finger 41 has a support member 42 positioned behind it. These comb fingers also serve to confine the flow of fluid and catalyst through the magnetic field.

In Figure 5 we have shown, in dotted lines, the lines of force which are present between the poles of the magnet when using the preferred structure of this invention, a portion of two rotating plates 18 and 19 and their associated washers 23 and 24 being shown. The magnet pole pieces connect with the U-shaped magnets and are arcuate in form extending somewhat beyond the U-shaped magnets, approximately from the inlet 32 to outlet 33.

In the preferred modification the magnetic washer is provided with a series of points such as 51 and 52. These points define grooves which should be as close together as is convenient for machining and should be spaced in the range of 30 to 60 grooves per inch, preferably about 50 grooves per inch. Another consideration is that the angle formed at a point or at the bottom of the groove should be 75 to 100 degrees, preferably about 90 degrees. It is desirable to keep these washers quite thin in order to avoid bleeding the magnetic field to the wipe-off area in the neighborhood of outlet 34, and otherwise reducing the magnetic gradient under the pole pieces. With such considerations it is possible to obtain the most satisfactory separation since the points can be made very sharp, this being important for satisfactory operation of this invention. In Figure 5, the lines of force are shown as dotted lines and these lines of magnetic flux tend to concentrate at each of the points such as at 51 and 52. For this reason there is a steady attraction toward these points and a material which is magnetizable will be drawn to the points whenever it is located between the magnetic poles. The movement of magnetizable materials toward a washer such as 24 is facilitated by the layer of non-magnetic material 18 which appears between magnetic material 24 and 23. A piece of magnetic material in the field is drawn toward the washer, and because of the stronger magnetic gradient directed to the points, it is quickly removed from the space.

Another consideration is that the gap or free space between the magnetizable washer and the non-magnetizable material on the adjacent disk, for instance, the space between washer 24 and disc 18, should be fairly small. A preferred range for this free space is in the range of 0.025 to 0.050 inch.

In the operation of this apparatus a solution of a lyophilic colloid, such as hydrogenated polybutadiene, containing magnetizable catalyst, such as nickel on kieselguhr, is introduced through conduit 32 into the free space between the rotating disks. The direction of rotation of the disks within chamber 10 is such that a point on a washer passes the inlet, passes beneath or between the poles of the magnets, passes outlet 33, and finally passes outlet 34. These disks are rotating all the time that the solution is being passed through the apparatus. These should turn no faster than necessary to keep the velocity of the washer equal to the linear velocity of the fluid passing thereover. The rotation can be slower than the velocity of the liquid if desired. Magnetic particles within the solution are attracted to the points defined by the grooves on the rotating washers, these particles being maintained or held on these points even after a particular point has passed from between the magnetic poles. The solution from which the catalyst has been removed is removed through conduit 33. As the disk continues rotating a magnetic particle attached thereto reaches the comb 41 which scrapes it off the rotating washer and into receiving chamber 38. From this chamber the particles can be removed through conduit 34. A portion of the material being treated is removed with the catalyst in conduit 34 and a portion of this material can be recycled to the same apparatus or, preferably, to a second separator for further concentration. Likewise, a second separation can be carried out on the solution recovered through conduit 33.

Multiple separation steps are often necessary when removing the nickel-kieselguhr catalyst from hydrogenated polymers of conjugated dienes since the presence of nickel has an adverse effect upon the properties of the material on aging. For the best product, the removal should be such that the dried polymer contains no more than 0.10 per cent nickel by weight, preferably less than 0.05 weight per cent nickel. The removal of hydrogenation catalysts from hydrogenated cottonseed oil can be carried out using this apparatus but such a separation does not present the problems that are encountered with the hydrogenated polymer of conjugated dienes.

It is frequently desirable to operate this separator at elevated temperatures and to preheat the solution prior to its introduction into the separator. This is most conveniently done by placing a preheater in line 32 and heating chamber 10 by suitable means. The temperature required is dependent upon the characteristics of the solution containing the magnetizable particles. For instance, a 5% by weight solution of hydrogenated polybutadiene in methylcyclohexane has a viscosity of approximately 2000 centipoises at about 80° F. and this drops to about 200 centipoises when the temperature is raised 10° F. It is preferable to operate above this gel point and, in this case, above 130° F.

As many possible embodiments may be made of this invention without departing from the spirit and scope thereof, it is to be understood that all matter herein set forth or shown in the accompanying drawing is to be interpreted as illustrative and not as unduly limiting our invention.

We claim:

1. A separator for removing magnetizable particles from a liquid, comprising a closed housing forming a substantially cylindrical chamber; a plurality of grooved magnetizable washers rotatable in said chamber, said washers defining an annulus within said chamber, said washers being spaced apart and rotatable by non-magnetizable disks providing a free space between the surface of one washer and the adjacent disk; magnetizable inserts opposingly disposed in opposite walls of said chamber corresponding to a portion of said annulus; means to establish a magnetic field between said inserts; means to drive said disks; a first conduit communicating with said free space adjacent one end of said inserts; a second conduit communicating with said free space adjacent the second end of said inserts; a third conduit communicating with said free space at a point between said first and second conduits and opposite said inserts; and means to remove solid material from said washers and to direct said removed material into said third conduit.

2. The separator of claim 1 in which said free space between a washer and the adjacent disk is in the range of from 0.025 to 0.050 inch.

3. The separator of claim 1 in which said washers are provided with 30 to 60 concentric grooves per inch, said grooves being cut so as to provide an angle of 75 to 100° at the top.

4. The separator of claim 1 in which said means to remove solid material from said washers comprises a comb provided with a finger extending into the free space between each washer and the adjacent disk.

5. The separator of claim 1 in which said means to establish a magnetic field between said inserts comprises a plurality of electromagnets.

6. The separator of claim 1 wherein the free space between the surface of one washer and the adjacent disc is less than the distance between the surface of the rotating disc and the inside surface of the washer mounted thereon.

References Cited in the file of this patent

UNITED STATES PATENTS

| | | |
|---|---|---|
| 405,045 | Mowrer | June 11, 1889 |
| 914,696 | Briney | Mar. 9, 1909 |
| 1,233,804 | Pike | July 17, 1917 |
| 2,678,729 | Spodig | May 18, 1954 |